(12) United States Patent
Kuhmann et al.

(10) Patent No.: US 9,314,989 B2
(45) Date of Patent: Apr. 19, 2016

(54) FLEXIBLE PIPE HAVING A MULTI-LAYERED STRUCTURE

(75) Inventors: Karl Kuhmann, Duelmen (DE); Andreas Dowe, Borken (DE); Rainer Goering, Borken (DE)

(73) Assignee: Evonik Degussa GmbH, Essen (DE)

( * ) Notice: Subject to any disclaimer, the term of this patent is extended or adjusted under 35 U.S.C. 154(b) by 28 days.

(21) Appl. No.: 13/640,552

(22) PCT Filed: Mar. 18, 2011

(86) PCT No.: PCT/EP2011/054142
§ 371 (c)(1),
(2), (4) Date: Oct. 11, 2012

(87) PCT Pub. No.: WO2011/128175
PCT Pub. Date: Oct. 20, 2011

(65) Prior Publication Data
US 2013/0032239 A1    Feb. 7, 2013

(30) Foreign Application Priority Data
Apr. 13, 2010   (DE) .......................... 10 2010 003 909

(51) Int. Cl.
| | | |
|---|---|---|
| F16L 11/00 | (2006.01) |
| B32B 1/08 | (2006.01) |
| B32B 27/28 | (2006.01) |
| B32B 27/32 | (2006.01) |
| B32B 27/34 | (2006.01) |
| F16L 11/04 | (2006.01) |

(52) U.S. Cl.
CPC . *B32B 1/08* (2013.01); *B32B 27/28* (2013.01); *B32B 27/32* (2013.01); *B32B 27/34* (2013.01); *F16L 11/04* (2013.01)

(58) Field of Classification Search
USPC ................. 138/125, 137, 141; 428/36.91
See application file for complete search history.

(56) References Cited

U.S. PATENT DOCUMENTS

| | | | |
|---|---|---|---|
| 5,052,444 A * | 10/1991 | Messerly et al. ............. 138/125 |
| 5,307,842 A * | 5/1994 | Lequeux ....................... 138/149 |
| 5,437,311 A * | 8/1995 | Reynolds ...................... 138/115 |
| 5,566,720 A * | 10/1996 | Cheney et al. ................ 138/137 |
| 5,743,304 A * | 4/1998 | Mitchell et al. .............. 138/137 |
| 5,763,034 A * | 6/1998 | Nishino et al. .............. 428/36.91 |
| 6,090,459 A * | 7/2000 | Jadamus et al. .............. 428/36.4 |
| 6,428,866 B1 * | 8/2002 | Jadamus et al. .............. 428/36.4 |
| 6,455,118 B1 * | 9/2002 | Dewimille et al. ........ 428/36.91 |
| 6,576,312 B1 * | 6/2003 | Ito et al. ...................... 428/36.91 |
| 7,069,956 B1 * | 7/2006 | Mosier ........................... 138/138 |
| 8,303,873 B2 | 11/2012 | Dowe et al. |
| 2002/0134449 A1 | 9/2002 | Nishi et al. |
| 2005/0019517 A1 * | 1/2005 | Dabouineau ............... 428/36.91 |
| 2005/0203203 A1 | 9/2005 | Bonnet et al. |
| 2005/0229991 A1 * | 10/2005 | Hardy et al. ................. 138/127 |
| 2006/0093772 A1 * | 5/2006 | Fish et al. ................. 428/36.91 |
| 2006/0182916 A1 | 8/2006 | Dowe et al. |
| 2006/0183869 A1 | 8/2006 | Dowe et al. |
| 2007/0036925 A1 | 2/2007 | Braad |
| 2007/0098941 A1 * | 5/2007 | Fish et al. ................. 428/36.91 |
| 2010/0009106 A1 | 1/2010 | Dowe et al. |
| 2010/0166995 A1 * | 7/2010 | Sato ........................... 428/36.91 |
| 2010/0300572 A1 | 12/2010 | Dowe et al. |
| 2010/0300573 A1 | 12/2010 | Dowe et al. |
| 2011/0165358 A1 | 7/2011 | Dowe et al. |
| 2011/0209768 A1 | 9/2011 | Dowe et al. |
| 2011/0226375 A1 * | 9/2011 | Harris et al. .................. 138/137 |
| 2012/0000541 A1 | 1/2012 | Dowe et al. |
| 2012/0006465 A1 | 1/2012 | Dowe et al. |
| 2012/0199317 A1 | 8/2012 | Hartmann et al. |
| 2012/0275774 A1 | 11/2012 | Goering et al. |
| 2012/0279577 A1 | 11/2012 | Goering et al. |
| 2013/0171388 A1 | 7/2013 | Pawlik et al. |

FOREIGN PATENT DOCUMENTS

| | | |
|---|---|---|
| CN | 1572822 A | 2/2005 |
| EP | 1 217 279 | 6/2002 |
| JP | 2005-15793 A | 1/2005 |
| WO | 2005 028198 | 3/2005 |

OTHER PUBLICATIONS

U.S. Appl. No. 13/639,765, filed Oct. 5, 2012, Kuhmann, et al.
U.S. Appl. No. 13/640,679, filed Oct. 11, 2012, Kuhmann, et al.
International Search Report Issued Jul. 11, 2011 in PCT/EP11/054142 Filed Mar. 18, 2011.
U.S. Appl. No. 14/224,807, filed Mar. 25, 2014, Franosch, et al.
U.S. Appl. No. 14/225,842, filed Mar. 26, 2014, Dowe, et al.

* cited by examiner

*Primary Examiner* — James Hook
(74) *Attorney, Agent, or Firm* — Oblon, McClelland, Maier & Neustadt, L.L.P.

(57) ABSTRACT

The invention relates to a flexible pipe having a multi-layered structure comprising unbonded layers, comprising an inner lining having the following layer arrangement: a) an innermost layer made of a fluoropolymer molding compound, b) an intermediate layer made of a molding compound on the basis of an olefinic polymer, which is selected from the group consisting of polyethylene, isotactic polypropylene, syndiotactic polypropylene and syndiotactic polystyrene, c) an outer layer made of a polyamide molding compound, wherein the layer made of a polyamide molding compound is particularly efficiently protected against hydrolysis. The pipe is thus particularly suited for offshore applications in oil or gas production.

8 Claims, No Drawings

FLEXIBLE PIPE HAVING A MULTI-LAYERED STRUCTURE

The present invention provides a flexible pipe of multilayer structure with unbonded layers. For the sake of simplicity and in accordance with English usage, it is referred to hereinafter as an unbonded flexible pipe. Such a pipe opposes the diffusion of gases out of a conveyed fluid with a high resistance, and can therefore be used particularly advantageously for conveying of crude oil, natural gas, methanol, $CO_2$ and the like.

Unbonded flexible pipes as such are prior art. Such pipes contain an inner lining, typically in the form of a polymer pipe, as a barrier against the escape of the fluid being conveyed, and also one or more reinforcement layers on the outside of this inner lining. The unbonded flexible pipe may contain additional layers, for example one or more reinforcement layers on the inside of the inner lining, in order to prevent the inner lining from collapsing at high external pressure. Such inner reinforcement is typically referred to as a carcass. In addition, an outer shell may be present, in order to provide a barrier against the penetration of liquid from the outer environment into the reinforcement layers or further inner polymeric or metallic functional layers.

Typical unbonded flexible pipes are described, for example, in WO 01/61232, U.S. Pat. No. 6,123,114 and U.S. Pat. No. 6,085,799; they are additionally characterized in detail in API Recommended Practice 17B, "Recommended Practice for Flexible Pipe", 3rd edition, March 2002, and in API Specification 17J, "Specification for Unbonded Flexible Pipe", 2nd edition, November 1999.

The expression "unbonded" in this context means that at least two of the layers, including reinforcement layers and polymer layers, are not joined to one another by construction means. In practice, the pipe comprises at least two reinforcement layers which are bonded to one another neither directly nor indirectly, i.e. via further layers, over the pipe length. This makes the pipe bendable and sufficiently flexible to roll it up for transport purposes.

Such unbonded flexible pipes are used in various designs in offshore applications and in various onshore applications for the transport of liquids, gases and slurries. They can be used, for example, for the transport of fluids where a very high or a very different water pressure exists over the length of the pipe, for instance in the form of risers which run from the seabed up to a device at or close to the sea surface, and also generally as pipes for the transport of liquids or gases between different devices, as pipes which are laid at great depth on the seabed, or as pipes between devices close to the sea surface.

In conventional flexible pipes, the reinforcement layer(s) consist(s) usually of steel wires, steel profiles or steel belts arranged in a spiral, and the individual layers may be configured with different winding angles relative to the pipe axis. There are additionally also embodiments in which at least one reinforcement layer or all reinforcement layers consist of fibers, for example of glass fibers, for instance in the form of fiber bundles or fiber fabrics, which are generally embedded into a polymeric matrix.

The inner lining consists in the prior art typically of a polyolefin such as polyethylene, which may also be crosslinked, of a polyamide such as PA11 or PA12, or of polyvinylidene fluoride (PVDF).

Polyethylene has the disadvantage of swelling significantly and then creeping in contact with crude oil or natural gas. In addition, the nonpolar medium being conveyed permeates outward through the polyethylene wall to a high degree. For this reason, polyethylene is generally not used for lines with direct contact to product streams, but rather predominantly for water injection lines.

Polyamides such as PA11 or PA12 are very suitable as a material for the inner lining due to their very good mechanical properties, excellent resistance to hydrocarbons and in the low degree of swelling. The particular suitability of polyamides has been described in detail in the publication OTC 5231 "Improved Thermoplastic Materials for Offshore Flexible Pipes". However, they can be used only up to a maximum of approx. 70° C. since increasing hydrolysis by the process water present in the crude oil or natural gas occurs at higher temperatures. This hydrolysis reduces the molecular weight of the polyamide to such a degree that the mechanical properties deteriorate considerably and the pipe ultimately fails. A detailed test procedure for determination of the hydrolysis properties is described in the API 17TR2 for PA11 and can be employed equally for PA12.

PVDF is used up to a maximum of 130° C. At temperatures above 130° C., however, blistering and microfoaming are to be expected in the event of a decline in the internal pressure. PVDF swells significantly up to about 25%, especially in supercritical $CO_2$; the blistering which occurs when the pressure drops results from the good permeation barrier, which is equivalent to poor diffusion. In this case, local gas desorption occurs within the layer, and the cohesive strength of the material is exceeded.

Overall, polyamide has become established as the material for the inner lining when temperatures are not excessively high, more particularly PA11 and PA12; a suitable composition is described, for example, in U.S. 2003/220449 A1. However, the hydrolysis tendency of the polyamide and the resulting short service life at relatively high operating temperatures are disadvantageous here. It would be desirable to have an inner lining, for example in the form of a pipe, which has the advantageous properties of the polyamide, but in which the hydrolysis of the polyamide is significantly reduced, such that the service life of the unbonded flexible pipe is distinctly prolonged.

U.S. Pat. No. 6,455,118 describes an unbonded flexible pipe with a two-layer inner lining, where the inner layer in direct contact with the fluid may be a polyolefin or a fluoropolymer, while the outer layer may be a PA11 or a PA12. However, such a layer arrangement does not solve the hydrolysis problem in a satisfactory manner: an inner fluoropolymer layer is not a sufficiently good water barrier; especially at elevated operating temperatures, considerable hydrolysis of the polyamide still takes place. An inner polyolefin layer could possibly be suitable for solving the problem of hydrolysis, but the polyolefin swells so greatly on contact with nonpolar media such as crude oil that the integrity of this layer at relatively high temperatures is no longer ensured.

The problem of hydrolytic polyamide degradation has surprisingly been solved by an at least three-layer design of the inner lining, wherein the layer arrangement is polyamide/polyolefin/fluoropolymer.

The invention accordingly provides an unbonded flexible pipe having an inner lining comprising the following layer arrangement:
a) an innermost layer of a fluoropolymer molding composition,
b) an intermediate layer of a molding composition based on an olefinic polymer selected from the group of polyethylene, isotactic polypropylene, syndiotactic polypropylene and syndiotactic polystyrene,
c) an outer layer of a polyamide molding composition.

In one possible embodiment, layers a), b) and c) follow one another directly. In this case, the olefinic polymer may be functionalized with polar groups, for example acid anhydride groups, in order to achieve adhesion to the adjacent layers. In other possible embodiments, an adhesion promoter layer is present between the layers according to a) and b) and/or between the layers according to b) and c). Suitable adhesion promoters are known to those skilled in the art; for example, maleic anhydride-grafted polyolefins, ethylenemethyl methacrylate-maleic anhydride terpolymers or polyethyleneimine-containing graft copolymers are suitable as adhesion promoters. A certain initial adhesion facilitates the assembly of the unbonded flexible pipe; for operation, however, layer adhesion is not absolutely necessary. Should gases collect between unbonded layers during operation, these can be led off by means of suitable construction measures.

In one possible embodiment, a carcass is present on the inside of the inner lining. Such carcasses and the design thereof are prior art. In a further possible embodiment, the unbonded flexible pipe does not contain any carcass, in particular when it is not to be operated under high external pressures.

The unbonded flexible pipe additionally comprises, on the outside of the inner lining, one or more reinforcement layers which typically consist of steel wires, steel profiles or steel belts arranged in a spiral. The design of these reinforcement layers is prior art. Preferably, at least one of these reinforcement layers is constructed such that it withstands the internal pressure, and at least one further reinforcement layer among these reinforcement layers is constructed such that it withstands tensile forces. The reinforcement layer(s) may be adjoined by an outer shell, typically in the form of a pipe or hose of a thermoplastic molding composition or an elastomer.

The fluoropolymer used for the layer according to a) may, for example, be a polyvinylidene fluoride (PVDF), an ethylene-tetrafluoroethylene copolymer (ETFE), an ETFE modified with the aid of a ter component, for example propene, hexafluoropropene, vinyl fluoride or vinylidene fluoride (for example EFEP), an ethylene-chlorotrifluoroethylene copolymer (E-CTFE), a polychlorotrifluoroethylene (PCTFE), a tetrafluoroethylene-hexafluoropropene-vinylidene fluoride copolymer (THV), a tetrafluoroethylene-hexafluoropropene copolymer (FEP) or a tetrafluoroethylene-perfluoroalkyl vinyl ether copolymer (PFA).

The olefinic polymer used for the layer according to b) may primarily be a polyethylene, especially a high-density polyethylene (HDPE), or an isotactic or syndiotactic polypropylene. The polyethylene is preferably crosslinked, typically either via reaction with free-radical initiators or via moisture-initiated crosslinking of grafted-on silyl groups. The polypropylene may be a homo- or copolymer, for example with ethylene or 1-butene as a comonomer, in which case it is possible to use random or else block copolymers. In addition, the polypropylene may also be impact-modified, for example in accordance with the prior art by means of ethylene-propylene rubber (EPM) or EPDM. Syndiotactic polystyrene, which is likewise usable in accordance with the invention, can be produced in a known manner by metallocene-catalyzed polymerization of styrene.

The molding compositions of the layers according to a) and b) may comprise the customary assistants and additives. The proportion of fluoropolymer or olefinic polymer is at least 50% by weight, preferably at least 60% by weight, more preferably at least 70% by weight, especially preferably at least 80% by weight and most preferably at least 90% by weight.

The polyamide is preparable from a combination of diamine and dicarboxylic acid, from an ω-amino carboxylic acid or the corresponding lactam. In principle, it is possible to use any polyamide, for example PA6, PA66 or copolyamides on this basis with units which derive from terephthalic acid and/or isophthalic acid (generally referred to as PPA), and also PA9T and PA10T and blends thereof with other polyamides. In a preferred embodiment, the monomer units of the polyamide contain an average of at least 8, at least 9 or at least 10 carbon atoms. In the case of mixtures of lactams, the arithmetic mean is considered here. In the case of a combination of diamine and dicarboxylic acid, the arithmetic mean of the carbon atoms of diamine and dicarboxylic acid in this preferred embodiment must be at least 8, at least 9 or at least 10. Suitable polyamides are, for example: PA610 (preparable from hexamethylenediamine [6 carbon atoms] and sebacic acid [10 carbon atoms]; the average of the carbon atoms in the monomer units here is thus 8), PA88 (preparable from octamethylenediamine and 1,8-octanedioic acid), PA8 (preparable from capryllactam), PA612, PA810, PA108, PA9, PA613, PA614, PA812, PA128, PA1010, PA10, PA814, PA148, PA1012, PA11, PA1014, PA1212 and PA12. The preparation of the polyamides is prior art. It will be appreciated that it is also possible to use copolyamides based thereon, in which case it is optionally also possible to use monomers such as caprolactam.

The polyamide may also be a polyether amide. Polyether amides are known in principle, for example, from DE-A 30 06 961. They contain a polyether diamine as a comonomer. Suitable polyether diamines are obtainable by converting the corresponding polyether diols by reductive amination or by coupling to acrylonitrile with subsequent hydrogenation (e.g. EP-A-0 434 244; EP-A-0 296 852). They generally have a number-average molar mass of 230 to 4000; the proportion thereof in the polyether amide is preferably 5 to 50% by weight.

Commercially available polyether diamines based on propylene glycol are commercially available as JEFFAMIN® D types from Huntsman. In principle, polyether diamines proceeding from 1,4-butanediol or 1,3-butanediol, or polyether diamines of mixed structure, for example with random or with blockwise distribution of the units originating from the diols, are also very suitable.

It is likewise also possible to use mixtures of different polyamides, provided that compatibility is sufficient. Compatible polyamide combinations are known to those skilled in the art; examples here include the combination of PA12/PA1012, PA12/PA1212, PA612/PA12, PA613/PA12, PA1014/PA12 and PA610/PA12, and corresponding combinations with PA11. In the case of doubt, compatible combinations can be determined by routine tests.

In one possible embodiment, a mixture of 30 to 99% by weight, preferably 40 to 98% by weight and more preferably 50 to 96% by weight of polyamide in the narrower sense, and 1 to 70% by weight, preferably 2 to 60% by weight and more preferably 4 to 50% by weight of polyether amide, is used.

In addition to polyamide, the molding composition may comprise further components, for example impact modifiers, other thermoplastics, plasticizers and other customary additives. What is required is merely that the polyamide forms the matrix of the molding composition.

Suitable impact modifiers are, for example, ethylene/α-olefin copolymers, preferably selected from
  a) ethylene/$C_3$- to $C_{12}$-α-olefin copolymers with 20 to 96% and preferably 25 to 85% by weight of ethylene. The $C_3$- to $C_{12}$-α-olefin used is, for example, propene, 1-butene, 1-pentene, 1-hexene, 1-octene, 1-decene or 1-dodecene. Typical examples thereof are ethylene-propylene rubber, and also LLDPE and VLDPE.

b) ethylene/$C_3$- to $C_{12}$-α-olefin/unconjugated diene terpolymers having 20 to 96% and preferably 25 to 85% by weight of ethylene and up to a maximum of about 10% by weight of an unconjugated diene such as bicyclo [2.2.1]heptadiene, 1,4-hexadiene, dicyclopentadiene or 5-ethylidenenorbornene. Suitable $C_3$- to $C_{12}$-α-olefins are likewise, for example, propene, 1-butene, 1-pentene, 1-hexene, 1-octene, 1-decene or 1-dodecene.

The preparation of these copolymers or terpolymers, for example with the aid of a Ziegler-Natta catalyst, is prior art.

Other suitable impact modifiers are styrene-ethylene/butylene block copolymers. Preference is given here to using styrene-ethylene/butylene-styrene block copolymers (SEBS), which are obtainable by hydrogenating styrene-butadiene-styrene block copolymers. However, it is also possible to use diblock systems (SEB) or multiblock systems. Such block copolymers are prior art.

These impact modifiers preferably contain acid anhydride groups, which are introduced in a known manner by thermal or free-radical reaction of the main chain polymer with an unsaturated dicarboxylic anhydride, an unsaturated dicarboxylic acid or an unsaturated monoalkyl dicarboxylate in a concentration sufficient for good attachment to the polyamide. Suitable reagents are, for example, maleic acid, maleic anhydride, monobutyl maleate, fumaric acid, citraconic anhydride, aconitic acid or itaconic anhydride. In this way, preferably 0.1 to 4% by weight of an unsaturated anhydride are grafted onto the impact modifier. According to the prior art, the unsaturated dicarboxylic anhydride or precursor thereof can also be grafted on together with a further unsaturated monomer, for example styrene, α-methylstyrene or indene.

Other suitable impact modifiers are copolymers which contain units of the following monomers:
a) 20% to 94.5% by weight of one or more α-olefins having 2 to 12 carbon atoms,
b) 5 to 79.5% by weight of one or more acrylic compounds selected from
  acrylic acid or methacrylic acid or salts thereof,
  esters of acrylic acid or methacrylic acid with a C1- to C12-alcohol which may optionally bear a free hydroxyl or epoxide function,
  acrylonitrile or methacrylonitrile,
  acrylamides or methacrylamides,
c) 0.5 to 50% by weight of an olefinically unsaturated epoxide, carboxylic anhydride, carboximide, oxazoline or oxazinone.

This copolymer is composed, for example, of the following monomers, though this list is not exhaustive:
a) α-olefins, for example ethylene, propene, 1-butene, 1-pentene, 1-hexene, 1-octene, 1-decene or 1-dodecene;
b) acrylic acid, methacrylic acid or salts thereof, for example with $Na^\oplus$ or $Zn^\oplus$ as the counterion; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate, 2-ethylhexyl methacrylate, hydroxyethyl acrylate, 4-hydroxybutyl methacrylate, glycidyl acrylate, glycidyl methacrylate, acrylonitrile, methacrylonitrile, acrylamide, N-methylacrylamide, N,N-dimethylacrylamide, N-ethylacrylamide, N-hydroxyethylacrylamide, N-propylacrylamide, N-butylacrylamide, N-(2-ethylhexyl)acrylamide, methacrylamide, N-methylmethacrylamide, N,N-dimethylmethacrylamide, N-ethylmethacrylamide, N-hydroxyethylmethacrylamide, N-propylmethacrylamide, N-butylmethacrylamide, N,N-dibutylmethacrylamide, N-(2-ethylhexyl)methacrylamide;
c) vinyloxirane, allyloxirane, glycidyl acrylate, glycidyl methacrylate, maleic anhydride, aconitic anhydride, itaconic anhydride, and also the dicarboxylic acids formed from these anhydrides by reaction with water; maleimide, N-methylmaleimide, N-ethylmaleimide, N-butylmaleimide, N-phenylmaleimide, aconitimide, N-methylaconitimide, N-phenylaconitimide, itaconimide, N-methylitaconimide, N-phenylitaconimide, N-acryloylcaprolactam, N-methacryloylcaprolactam, N-acryloyllaurolactam, N-methacryloyllaurolactam, vinyloxazoline, isopropenyloxazoline, allyloxazoline, vinyloxazinone or isopropenyloxazinone.

In the case of use of glycidyl acrylate or glycidyl methacrylate, they simultaneously also function as the acrylic compound b), such that no further acrylic compound need be present given a sufficient amount of the glycidyl(meth)acrylate. In this specific embodiment, the copolymer contains units of the following monomers:
a) 20 to 94.5% by weight of one or more α-olefins having 2 to 12 carbon atoms,
b) 0 to 79.5% by weight of one or more acrylic compounds selected from
  acrylic acid or methacrylic acid or salts thereof,
  esters of acrylic acid or methacrylic acid with a $C_1$- to $C_{12}$-alcohol,
  acrylonitrile or methacrylonitrile,
  acrylamides or methacrylamides,
c) 0.5 to 80% by weight of an ester of acrylic acid or methacrylic acid which contains an epoxy group,
where the sum of b) and c) adds up to at least 5.5% by weight.

The copolymer may contain small amounts of further polymerized monomers provided that they do not significantly impair the properties, for example dimethyl maleate, dibutyl fumarate, diethyl itaconate or styrene.

The preparation of such copolymers is prior art. A multitude of different types thereof are available as commercial products, for example under the LOTADER® name (Arkema; ethylene/acrylate/ter component or ethylene/glycidyl methacrylate).

In a preferred embodiment, the polyamide molding composition here comprises the following components:
1. 60 to 96.5 parts by weight of polyamide,
2. 3 to 39.5 parts by weight of an impact-modifying component which contains acid anhydride groups, where the impact-modifying component is selected from ethylene/α-olefin copolymers and styrene-ethylene/butylene block copolymers,
3. 0.5 to 20 parts by weight of a copolymer which contains units of the following monomers:
  a) 20% to 94.5% by weight of one or more α-olefins having 2 to 12 carbon atoms,
  b) 5 to 79.5% by weight of one or more acrylic compounds selected from
    acrylic acid or methacrylic acid or salts thereof,
    esters of acrylic acid or methacrylic acid with a $C_1$- to $C_{12}$-alcohol which may optionally bear a free hydroxyl or epoxide function,
    acrylonitrile or methacrylonitrile,
    acrylamides or methacrylamides,
  c) 0.5 to 50% by weight of an olefinically unsaturated epoxide, carboxylic anhydride, carboximide, oxazoline or oxazinone,
where the sum of the parts by weight of the components according to 1., 2. and 3. is 100.

In a further preferred embodiment, the molding composition here comprises:
1. 65 to 90 parts by weight and more preferably 70 to 85 parts by weight of polyamide,
2. 5 to 30 parts by weight, more preferably 6 to 25 parts by weight and especially preferably 7 to 20 parts by weight of the impact-modifying component,
3. 0.6 to 15 parts by weight and more preferably 0.7 to 10 parts by weight of the copolymer, which preferably contains units of the following monomers:
   a) 30% to 80% by weight of α-olefin(s),
   b) 7 to 70% by weight and more preferably 10 to 60% by weight of the acrylic compound(s),
   c) 1 to 40% by weight and more preferably 5 to 30% by weight of the olefinically unsaturated epoxide, carboxylic anhydride, carboximide, oxazoline or oxazinone.

The impact-modifying component used may additionally also be nitrile rubber (NBR) or hydrogenated nitrile rubber (H-NBR), which optionally contain functional groups. Corresponding molding compositions are described in U.S. 2003/0220449A1.

Other thermoplastics which may be present in the polyamide molding composition are primarily polyolefins. In one embodiment, as described above for the impact modifiers, they may contain acid anhydride groups and are then optionally present together with an unfunctionalized impact modifier. In a further embodiment, they are unfunctionalized and are present in the molding composition in combination with a functionalized impact modifier or a functionalized polyolefin. The term "functionalized" means that the polymers according to the prior art are provided with groups which can react with the polyamide end groups, for example acid anhydride groups, carboxyl groups, epoxide groups or oxazoline groups. Preference is given here to the following compositions:
1. 50 to 95 parts by weight of polyamide,
2. 1 to 49 parts by weight of functionalized or unfunctionalized polyolefin and
3. 1 to 49 parts by weight of functionalized or unfunctionalized impact modifier, where the sum of the parts by weight of components 1., 2. and 3. is 100.

The polyolefin here is, for example, polyethylene or polypropylene. In principle, it is possible to use any commercially available type. Useful examples include: high-, medium- or low-density linear polyethylene, LDPE, ethylene/acrylic ester copolymers, ethylene-vinyl acetate copolymers, isotactic or atactic homopolypropylene, random copolymers of propene with ethene and/or butene-1, ethylene-propylene block copolymers and the like. The polyolefin can be prepared by any known process, for example according to Ziegler-Natta, by the Phillips process, by means of metallocenes or by free-radical means. The polyamide in this case may also, for example, be PA6 and/or PA66.

In one possible embodiment, the molding composition contains 1 to 25% by weight of plasticizer, more preferably 2 to 20% by weight and especially preferably 3 to 15% by weight.

Plasticizers and their use in polyamides are known. A general overview of plasticizers suitable for polyamides can be found in Gächter/Müller, Kunststoffadditive [Polymer Additives], C. Hanser publishers, 2nd edition, p. 296.

Customary compounds suitable as plasticizers are, for example, esters of p-hydroxybenzoic acid having 2 to 20 carbon atoms in the alcohol component or amides of arylsulfonic acids having 2 to 12 carbon atoms in the amine component, preferably amides of benzenesulfonic acid. Useful plasticizers include ethyl p-hydroxybenzoate, octyl p-hydroxybenzoate, i-hexadecyl p-hydroxybenzoate, N-n-octyltoluenesulfonamide, N-n-butylbenzenesulfonamide or N-2-ethylhexylbenzenesulfonamide.

In addition, the molding composition may also comprise customary amounts of additives which are required to establish particular properties. Examples thereof are pigments or fillers such as carbon black, titanium dioxide, zinc sulfide, reinforcing fibers, for example glass fibers, processing aids such as waxes, zinc stearate or calcium stearate, antioxidants, UV stabilizers and additives which impart antielectrostatic properties to the product, for example carbon fibers, graphite fibrils, fibers of stainless steel or conductivity black.

The proportion of polyamide in the molding composition according to c) is at least 50% by weight, preferably at least 60% by weight, more preferably at least 70% by weight, especially preferably at least 80% by weight, and most preferably at least 90% by weight.

The internal diameter of the inner lining is generally at least 30 mm, at least 40 mm, at least 50 mm or at least 60 mm, and not more than 900 mm, not more than 800 mm, not more than 700 mm or not more than 620 mm; in individual cases, it may, however, also be higher or lower. The total wall thickness of the inner lining is generally at least 2 mm, at least 2.5 mm, at least 3 mm, at least 4 mm or at least 5 mm, and not more than 50 mm, not more than 40 mm, not more than 30 mm, not more than 25 mm, not more than 20 mm or not more than 16 mm; in individual cases, it may also be higher or lower. The thickness of the layer according to a) of the fluoropolymer molding composition is 0.5 to 30% and preferably 1 to 20% of the total wall thickness, the thickness of the layer according to b) of the molding composition based on an olefinic polymer is 1 to 60% and preferably 2 to 50% of the total wall thickness and the thickness of the layer according to c) of the polyamide molding composition is 10 to 98.5% and preferably 20 to 97% of the total wall thickness.

According to the prior art, the inner lining is produced by coextrusion, by winding extrusion of the individual layers, or if appropriate by winding of tapes.

In the simultaneous presence of the layers according to a) and b), the polyamide in the layer according to c) has excellent protection from diffusion of water from the fluid being conveyed; hydrolysis of the polyamide is therefore considerably suppressed. The service life of the pipe is therefore considerably improved specifically also at operating temperatures above 70° C.

The invention claimed is:
1. A flexible pipe of multilayer structure with at least two unbonded layers, said pipe comprising an inner lining comprising layers a), b) and c) following one another directly, wherein:
   a) is an innermost layer comprising a fluoropolymer molding composition;
   b) is an intermediate layer comprising a molding composition comprising an olefinic polymer selected from the group consisting of polyethylene, isotactic polypropylene, syndiotactic polypropylene and syndiotactic polystyrene; and
   c) is an outer layer comprising a polyamide molding composition; and
   the flexible pipe with the inner lining comprising a), b) and c) provides improved protection from diffusion of water from the fluid being conveyed through the pipe and improved service life at operating temperatures above 70° C. relative to a flexible pipe with an inner lining of the same thickness comprising layers a) and c) without b) and an inner lining of the same thickness comprising layers b) and c) without a).

2. The flexible pipe of claim 1, wherein the inner lining is a pipe.

3. The flexible pipe of claim 2, further comprising one or more layers selected from the group consisting of
an inner carcass,
an outer reinforcing layer, and
an outer shell.

4. The flexible pipe of claim 1, further comprising one or more layers selected from the group consisting of
an inner carcass,
an outer reinforcing layer, and
an outer shell.

5. The flexible pipe of claim 1, wherein the polyamide comprising the polyamide molding composition of outer layer c) is a polyether amide.

6. The flexible pipe of claim 1, wherein the thickness of the innermost layer a) of the fluoropolymer molding composition is 1 to 20% of the total wall thickness of the inner lining, the thickness of the intermediate layer b) of the molding composition based on an olefinic polymer is 2 to 50% of the total wall thickness of the inner lining, and the thickness of the outer layer c) of the polyamide molding composition is 20 to 97% of the total wall thickness of the inner lining.

7. The flexible pipe of claim 1, wherein the monomer units of the polyamide contain an average of at least 8 carbon atoms.

8. The flexible pipe of claim 1, wherein the polyethylene comprising the molding composition of intermediate layer b) is high density polyethylene.

* * * * *